United States Patent [19]
Breuninger et al.

[11] Patent Number: 4,503,094
[45] Date of Patent: Mar. 5, 1985

[54] PROCESS FOR PRODUCING SCRATCH RESISTANT ANTISTATIC SOUND AND PICTURE CARRIER

[75] Inventors: Axel Breuninger, Lorch; Richard Pollmann; Peter Scheyrer, both of Schwabisch Gmund, all of Fed. Rep. of Germany

[73] Assignee: GFO Gesellschaft Fer Oberflachentechnik mbH, Gmund, Fed. Rep. of Germany

[21] Appl. No.: 540,851

[22] Filed: Oct. 11, 1983

Related U.S. Application Data

[62] Division of Ser. No. 349,824, Feb. 18, 1982, Pat. No. 4,444,849.

[30] Foreign Application Priority Data

Feb. 21, 1981 [DE] Fed. Rep. of Germany ....... 3106573
Feb. 21, 1981 [DE] Fed. Rep. of Germany ....... 3106544

[51] Int. Cl.³ .......................... H04N 1/28; B32B 3/02
[52] U.S. Cl. .................................. 427/250; 427/255.1; 427/255.2; 427/255.7; 427/296; 428/626; 428/332; 428/699

[58] Field of Search ................. 427/250, 255.1, 255.2, 427/255.7, 296; 358/342; 369/272; 428/332, 64, 461, 463, 626, 672, 681, 697, 699

[56] References Cited

U.S. PATENT DOCUMENTS 4,077,051 2/1978 Vossen, Jr. .......................... 428/64

FOREIGN PATENT DOCUMENTS 1474842 5/1977 United Kingdom .

Primary Examiner—Paul J. Thibodeau
Attorney, Agent, or Firm—Cushman, Darby & Cushman

[57] ABSTRACT

Scratch resistant and antistatic sound and picture carriers made of synthetic resins are obtained by providing their surfaces with thin metal layer. The previously known gold layers applied electrolytically or in high vacuum have the disadvantage that they either were not sufficiently resistant to abrasion or the quality of reproduction was greatly impaired. Better results are obtained by providing the surfaces of the sound or picture carrier (1) with a thin coating (2), made of an iron-chromium-nickel alloy applied in a high vacuum and in a given case coating this layer with a noble metal coating (3), especially a gold coating, likewise applied in a high vacuum.

23 Claims, 2 Drawing Figures

PROCESS FOR PRODUCING SCRATCH RESISTANT ANTISTATIC SOUND AND PICTURE CARRIER

This a division of application Ser. No. 349,824 filed Feb. 18, 1982, now U.S. Pat. No. 4,444,849.

BACKGROUND OF THE INVENTION

The invention is directed to scratch resistant, antistatic sound and picture carriers made of synthetic resins, especially sound and video discs which are provided with a metallic surface layer and process for their production.

Sound and picture carriers made of synthetic resins, such as sound discs, video discs, or other mechanically contacted information carriers, relatively quickly after a limited frequency of play-back lose their quality of reproduction through mechanical wear of the carrier material and through electrostatically attracted dust. Besides the electrostatic charges lead to impairing the quality of reproduction.

It is known to make sound discs scratch resistant and antistatic by coating with gold coatings. For this purpose the carrier disc, for example made of polyvinyl chloride, is first coated chemically with an electrically conductive nickel layer having a thickness of $2-3\mu$ and this is subsequently gold plated electrolytically with a layer thickness of about $5\mu$. Such sound discs indeed no longer can be played back without objection and have a low sound quality.

Furthermore, it is known to deposit on sound discs in a high vacuum a thin layer of gold having a thickness of about $0.5\mu$. Such sound discs have a very good optical effect and also permit play-back. however, the adhesive strength of the gold layer to the synthetic resin carrier is so low that the gold coating after a few play-back cycles is abraded off.

It is true that by applying a base lacquer layer to the carrier surface before the gold coating the adhesive strength of the gold layer can be improved, however, the lacquer layer adds to the sound or picture tracks so that such discs can no longer be played back and only serve decorative purposes. The decorative purpose is prominent also in all other previously known sound and video discs provided with a metal layer. These are little suited for play-backs.

Therefore, it was the problem of the present invention to provide scratch resistant and antistatic sound and picture carriers made of synthetic resin, especially sound and video discs, which are provided with a metal surface, which not only has a decorative appearance but also a frequently as desired permits playing back with constant sound or picture quality.

SUMMARY OF THE INVENTION

This problem was solved according to the invention by coating the surfaces of the sound or picture carrier with a thin coating of an iron-chromium-nickel alloy applied in a high vacuum.

Preferably this iron-chromium-nickel alloy contains 10 to 25 weight % chromium and 5 to 20 weight % nickel especially 15 to 22 weight % chromium and 8 to 15 weight % nickel, the balance iron.

An especial decorative effect and a particularly good play-back quality is produced if the coating of an iron-chromium-nickel alloy is coated with a thin noble metal coating, likewise applied in a high vacuum. In this case, it is possible to use for the first coating a nickel free iron-chromium alloy which preferably contains 10 to 22 weight % chromium, especially 12 to 18 weight % chromium.

The noble metal layer can be made of all known noble metals, as for example, platinum, palladium, rhodium, iridium, silver, gold, or their alloys. Gold and gold alloys have proven best.

Advantageously the layer thickness of the iron-chromium-alloy coating is 0.02 to $0.3\mu$, that of the noble metal coating 0.2 to $0.6\mu$, especially 0.3 to $0.5\mu$. If only an iron-chromium nickel alloy is applied as coating, without an additional noble metal protection layer then the thickness of the layer likewise is 0.2 to $0.6\mu$.

The production of the sound and pictures carrier of the invention preferably takes place by applying in a high vacuum to the surfaces of of the synthetic resin carrier which have been preheated in known manner a thin layer of iron-chromium-nickel alloy or first a thin layer of an iron-chromium alloy and directly thereafter a thin noble metal layer. The application of the coatings advantageously takes place by thermal vapor deposition or electron beam deposition. Of course, the layers can also be applied by sputtering. Thereby a high vacuum of a pressure $<8\times10^{-4}$ mbar has proven good.

It is important for the adhesive deposition of the metal layers on the synthetic resin carrier that after a cleansing with washing agents or solvents the synthetic resin carrier be electrostatically neutralized, for example with an alpha-emitter. Furthermore, it is important that the application of the iron-chromium layer serving as adhesive agent and the noble metal layer take place directly in succession within a single deposition cycle, without breaking the vacuum.

Sound discs treated in this manner can be played-back with a customary commercial sound pickup system more than a thousand times without an audible deterioration of the quality of reproduction. Antistatic cleansing of the disc can be eliminated. They are scratch free, no abrasion can be detected on the play-back needle. The metallic luster imparts to the discs a decorative appearance which remains unchanged over long periods of time.

Unless otherwise indicated all parts and percentages are by weight.

The compositions can comprise, consist essentially of, or consist of the stated materials and the process can comprise, consist essentially of, or consist of the recited steps with such materials.

DETAILED DESCRIPTION

Figure 1:
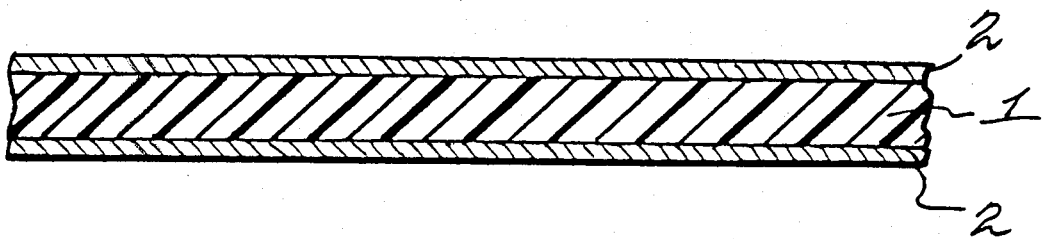
FIG. 1 is a schematic cross-sectional illustration of a sound disc according to the invention.

Referring more specifically to FIG. 1 there is shown a sound carrier having a synthetic resin layer 1 (e.g. of polyvinyl chloride) having applied thereto in high vacuum layers 2 of an iron-chromium-nickel alloy having 18% chromium and 8% nickel, balance iron.

Figure 2:
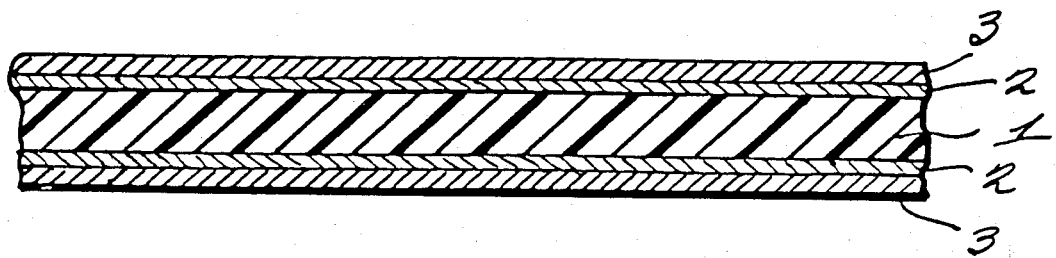
FIG. 2 is a similar schematic illustration including an outer noble metal layer coating.

As shown in FIG. 2 the synthetic resin carrier 1 (e.g. made of polyvinyl chloride) is provided with layers 2 of iron-chromium alloy having 13% chromium, balance nickel and applied in a high vacuum and further provided with outerlayers 3 of gold, likewise applied in a high vacuum. The vacuum for example, is less than $8\times10^{-4}$ mbar.

What is claimed is:

1. A process for preparing a scratch resistant, antistatic sound or picture carrier comprising applying in a high vacuum to the surfaces of a synthetic resin layer (1) outer layers consisting of an iron-chromium-nickel alloy containing 10 to 25 weight % chromium, 5 to 20 weight % nickel, balance iron, or (2) applying thereto intermediate layers consisting essentially of either (a) an iron-chromium-nickel alloy consisting of 10 to 25 weight % chromium, 5 to 20 weight % nickel, balance iron or (b) an iron-chromium alloy and then without breaking the vacuum applying to the surfaces of the intermediate layer outer layers consisting essentially of a noble metal or a noble metal alloy, the outer layers in each of (1) or (2) having a thickness of 0.2 to 0.6μ.

2. A process according to claim 1 which is a sound or video disc.

3. A process according to claim 2 wherein the synthetic resin is a vinyl chloride resin.

4. A process according to claim 1 wherein the carrier has as the outer layers or the intermediate layers an alloy consisting of an iron-chromium-nickel alloy containing 10 to 25 weight % chromium, 5 to 20 weight % nickel, balance iron.

5. A process according to claim 4 wherein the outer layers comprise the iron chromium-nickel alloy.

6. A process according to claim 5 wherein the iron-chromium-nickel alloy contains 15 to 22 weight % chromium, 8 to 15 weight % nickel, balance iron.

7. A process according to claim 4 wherein the iron-chromium-nickel alloy is applied as intermediate layers and there are present as a coating thereon the outer layers of noble metal or noble metal alloy.

8. A process according to claim 7 wherein the outer layers are made of gold.

9. A process according to claim 1 wherein the carrier has as the outer layers a noble metal or noble metal alloy and has as intermediate layers an iron-chromium alloy.

10. A process according to claim 9 wherein the iron-chromium alloy contains 10 to 22 weight % chromium, balance iron.

11. A process according to claim 10 wherein the iron-chromium alloy contains 12 to 18 weight % chromium.

12. A process according to claim 10 wherein the outer layers are made of gold.

13. A process according to claim 1 wherein the outer layers have a thickness of 0.2 to 0.6μ and the intermediate layers are present and have a thickness of 0.02 to 0.3μ.

14. A process according to claim 4 wherein the outer layers have a thickness of 0.2 to 0.6μ and the intermediate layers are present and have a thickness of 0.02 to 0.3μ.

15. A process according to claim 7 wherein the outer layers have a thickness of 0.2 to 0.6μ and the intermediate layers have a thickness of 0.02 to 0.3μ.

16. A process according to claim 8 wherein the outer layers have a thickness of 0.2 to 0.6μ and the intermediate layers have a thickness of 0.02 to 0.3μ.

17. A process according to claim 10 wherein the outer layers have a thickness of 0.2 to 0.6μ and the intermediate layers have a thickness of 0.02 to 0.3μ.

18. A process according to claim 12 wherein the outer layers have a thickness of 0.2 to 0.6μ and the intermediate layers have a thickness of 0.02 to 0.3μ.

19. A process according to claim 1 wherein there is applied to the surfaces of the synthetic resin layer an iron-chromium alloy.

20. A process according to claim 19 wherein the application in high vacuum is by vapor deposition.

21. A process according to claim 1 wherein the application in high vacuum is by vapor deposition.

22. A process according to claim 1 wherein the vacuum is of a pressure $<8\times10^{-4}$ mbar.

23. A process according to claim 1 comprising electrostatically neutralizing the surfaces of the synthetic resin layer and thereafter applying the iron-chromium alloy or iron-chromium-nickel alloy layers and the noble metal alloy layers by vapor deposition.

* * * * *